(12) United States Patent
Matsumoto et al.

(10) Patent No.: US 8,302,476 B2
(45) Date of Patent: Nov. 6, 2012

(54) ANGULAR VELOCITY MEASURING DEVICE

(75) Inventors: Masahiro Matsumoto, Hitachi (JP); Yasushi Okada, Tendo (JP); Hisao Sonobe, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 439 days.

(21) Appl. No.: 12/376,244

(22) PCT Filed: Sep. 15, 2006

(86) PCT No.: PCT/JP2006/318794
§ 371 (c)(1),
(2), (4) Date: Nov. 10, 2009

(87) PCT Pub. No.: WO2008/032415
PCT Pub. Date: Mar. 20, 2008

(65) Prior Publication Data
US 2010/0095769 A1    Apr. 22, 2010

(51) Int. Cl.
*G01C 19/56* (2012.01)
(52) U.S. Cl. .................................................. 73/504.12
(58) Field of Classification Search ............... 73/504.12, 73/504.14, 504.16
See application file for complete search history.

(56) References Cited

U.S. PATENT DOCUMENTS

| 5,635,638 A | 6/1997 | Geen |
| 5,945,599 A | 8/1999 | Fujiyoshi et al. |
| 2005/0081632 A1* | 4/2005 | Malvern et al. ............ 73/514.12 |

FOREIGN PATENT DOCUMENTS

| JP | 10-170276 A | 6/1998 |
| JP | 2001-133479 A | 5/2001 |
| JP | 2002-188923 A | 7/2002 |
| JP | 2006-242730 A | 9/2006 |

OTHER PUBLICATIONS

International Search Report dated Jan. 9, 2007 with an partial English translation of the pertinent portions (Six (6) pages).

* cited by examiner

*Primary Examiner* — John Chapman, Jr.
(74) *Attorney, Agent, or Firm* — Crowell & Moring LLP

(57) ABSTRACT

Disclosed herein is an angular velocity measuring device including: first and second oscillators elastically supported on a substrate; an elastic connecting beam elastically connecting the first and the second oscillator; and an oscillating means for oscillating the first and the second oscillator for differential oscillation, wherein a viscous force generating means for suppressing in-phase oscillation of the first and the second oscillator is incorporated into the elastic connecting beam.

11 Claims, 7 Drawing Sheets

F I G . 3
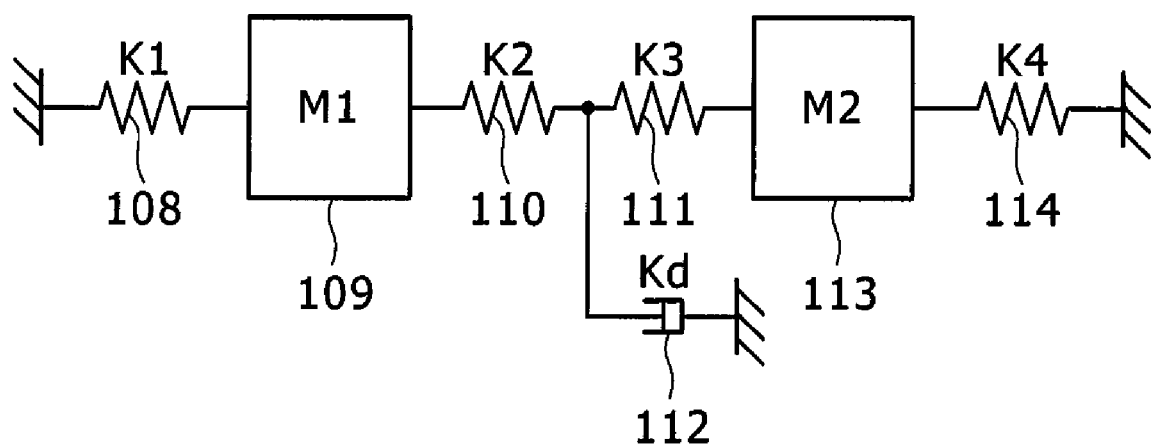

ANGULAR VELOCITY MEASURING DEVICE

BACKGROUND OF THE INVENTION

1. Field of the Invention

The present invention relates to an oscillation type angular velocity measuring device and, more particularly, to an angular velocity measuring device capable of reducing the influence of the oscillation of an oscillator in an oscillating direction.

2. Description of the Related Art

A mechanical quantity measuring device mentioned in JP-A 2002-188923 is an example of an angular velocity measuring device provided with two oscillators placed on a substrate, such as a silicon substrate, and a connecting beam elastically connecting the two oscillators.

Reduction of the influence of oscillation is a problem in the oscillation type angular velocity measuring device.

The foregoing known angular velocity measuring device provides in-phase signals indicating variations of the respective capacitances of flat electrodes attached to two oscillators related with an oscillation along an X-axis extending in the direction of oscillation of the oscillators and an oscillation along a Y-axis extending in a direction perpendicular to the direction of oscillation and parallel to the substrate. As regards angular velocity, it is intended to eliminate the influence of oscillation, which is an in-phase component, by determining the difference between the two oscillators by using a differential signal.

However, the foregoing prior art does not take anything into consideration about the very sharp reaction of the two oscillators to oscillations along the X-axis.

In the oscillation type angular velocity measuring device, viscous force (damping effect) acting in directions parallel to the X-axis is diminished and Q (an index of ability with resonance) is increased so that oscillators oscillate in a large amplitude in directions parallel to the X-axis to enhance the sensitivity to angular velocity. The structure formed by elastically connecting the two oscillators by the connecting beam has two oscillation modes, namely, a differential oscillation mode and an in-phase oscillation mode. Since an oscillation in the differential oscillation mode affects angular velocity measuring sensitivity, a high Q is desired. Since an oscillation in the in-phase oscillation mode cause an error in angular velocity measurement, a low Q is desired. When the viscous force acting in directions parallel to the X-axis is reduced and the Q of the differential oscillation is increased, the Q of the in-phase oscillation increases.

In the angular velocity measuring device provided with the two oscillators connected by the elastic connecting beam, the resonance frequency of an in-phase oscillation is lower than that of the differential oscillation. The resonance frequency of the in-phase oscillation is dependent on the spring constant of a support beam elastically supporting the two oscillators and the substrate. The stress influence of the substrate can be reduced when support beam has a low spring constant. However, when the support beam has a low spring constant, the resonance frequency of the in-phase oscillation is low and the strength of the oscillation parallel to the X-axis acting on the angular velocity measuring device is reduced; that is, when the two oscillators make an in-phase oscillation of a resonance frequency, the two oscillators making the in-phase oscillation resonate to cause a large error in a measured angular velocity. Although oscillations that act on the angular velocity measuring device can be reduced by a known method that uses an oscillation absorbing member, such as a rubber member, the lower the frequency of the oscillation, the lower is the oscillation reducing effect of the oscillation absorbing member.

In other words, in the angular velocity measuring device provided with the two oscillators connected by the elastic connecting beam, the Q of the in-phase oscillation increases when the Q of the differential oscillation is increased by reducing the viscous force (damping effect) acting in a direction parallel to the X-axis, and the resonance frequency of the in-phase oscillation decreases and the influence of oscillation becomes worse when an support beam having a low spring constant is used to reduce the stress influence of the substrate.

SUMMARY OF THE INVENTION

Accordingly, it is an object of the present invention to provide an angular velocity measuring device provided with two oscillators the Q of the differential oscillation of which is high, not significantly affected by the stress influence of a substrate, and not significantly affected by oscillations.

To achieve the object, a first aspect of the present invention is directed to an angular velocity measuring device including: first and second oscillators elastically supported on a substrate; an elastic connecting beam elastically connecting the first and the second oscillator; and an oscillating means for oscillating the first and the second oscillator for differential oscillation, wherein a viscous force generating means for suppressing in-phase oscillation of the first and the second oscillator is incorporated into the elastic connecting beam.

In this case, the viscous force generating means may include first flat plates mechanically connected to the elastic connecting beam, and second flat plates mechanically connected to the substrate opposite to the first flat plates, respectively.

The angular velocity measuring device according to the first aspect may further include a capacitance measuring means for measuring capacitance between the first flat plates mechanically connected to the elastic connecting beam and the second flat plates mechanically connected to the substrate.

The angular velocity measuring device according to the first aspect may further include an electrostatic force generating means for exerting electrostatic force on the first and the second oscillator such that the capacitance measuring means provides a predetermined output.

The angular velocity measuring device according to the first aspect may further include a cover disposed opposite to the substrate so as to cover the first and the second oscillators, wherein a gap between the cover and the viscous force generating means may be narrower than a gap between the cover, and the first and the second oscillator.

The angular velocity measuring device according to the first aspect may further include an acceleration measuring means that provides a signal based on the capacitance between the first flat plates mechanically connected to the elastic connecting beam and the second flat plates mechanically connected to the substrate and indicating an acceleration in directions in which the first and the second oscillator oscillate.

A second aspect of the present invention is directed to an angular velocity measuring device including: first and second oscillators elastically supported on a substrate; an elastic connecting beam elastically connecting the first and the second oscillator; and first and second electrostatic generating means for exerting electrostatic force on the first and the second oscillator to oscillate the first and the second oscillator for differential oscillation, wherein the first oscillator is connected mechanically to the first electrostatic force generating means by a first connecting beam such that the first oscillator has a rigidity with respect to oscillating directions higher than a rigidity with respect to directions parallel to the substrate in which the first oscillator oscillates, the second oscillator is connected mechanically to the second electrostatic force generating means by a second connecting beam such that the second oscillator has a rigidity with respect to oscillating directions higher than a rigidity with respect to directions parallel to the substrate in which the second oscillator oscillates, and the first connecting beam, the second connecting beam, a center of gravity of the first oscillator, and a center of gravity of the second oscillator are aligned.

In this case, a viscous force generating means for suppressing in-phase oscillation of the first and the second oscillator may be incorporated into the elastic connecting beam.

Thus, the present invention provides an angular velocity measuring device provided with two oscillators the Q of the differential oscillation of which is high, not significantly affected by the stress influence of a substrate, and not significantly affected by oscillations.

BRIEF DESCRIPTION OF THE DRAWINGS

The above and other objects, features and advantages of the present invention will become apparent from the following description taken in connection with the accompanying drawings, in which:

FIG. 3 is a mechanical model of the measuring element included in the angular velocity measuring device in the first embodiment;

DESCRIPTION OF THE PREFERRED EMBODIMENTS

Preferred embodiments of the present invention will be described with reference to the accompanying drawings.

Figure 1:
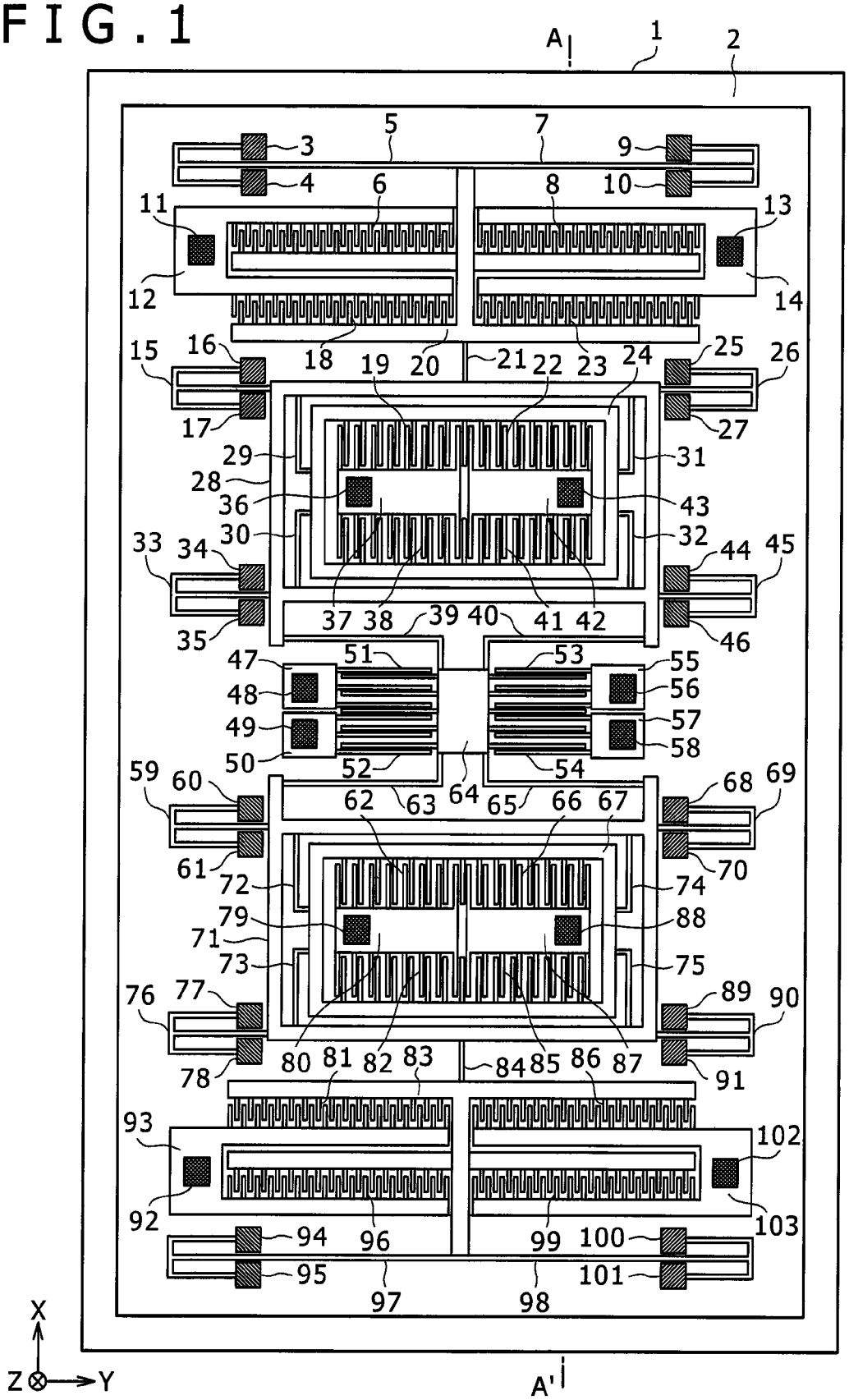
FIG. 1 is a plan view of a measuring element included in an angular velocity measuring device in a first embodiment according to the present invention.
Figure 2:
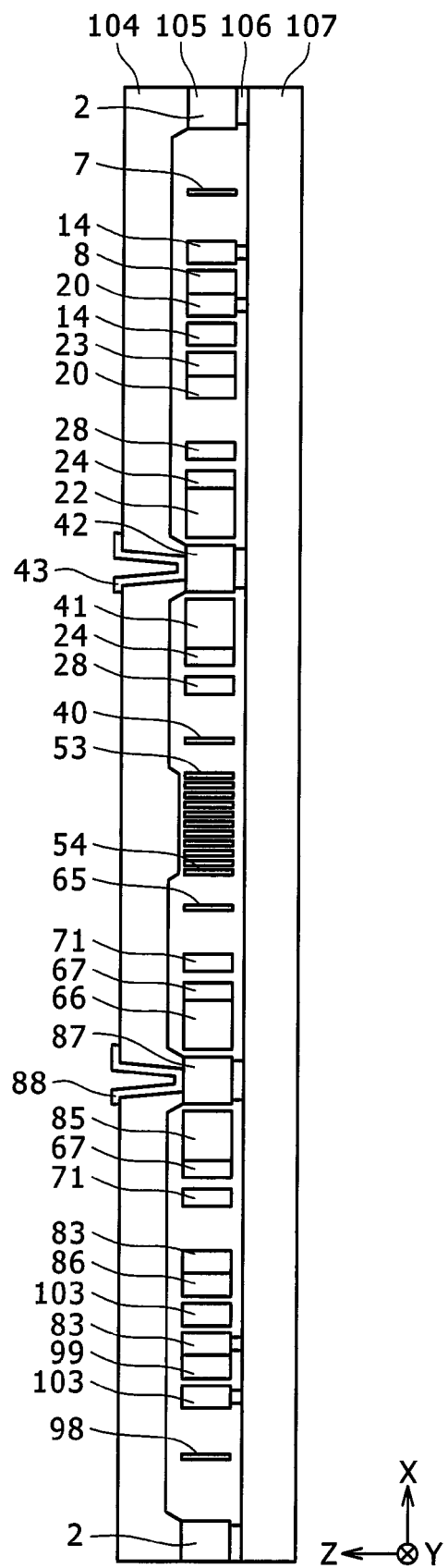
FIG. 2 is a sectional view taken on the line A-A' in FIG. 1.
Figure 4:
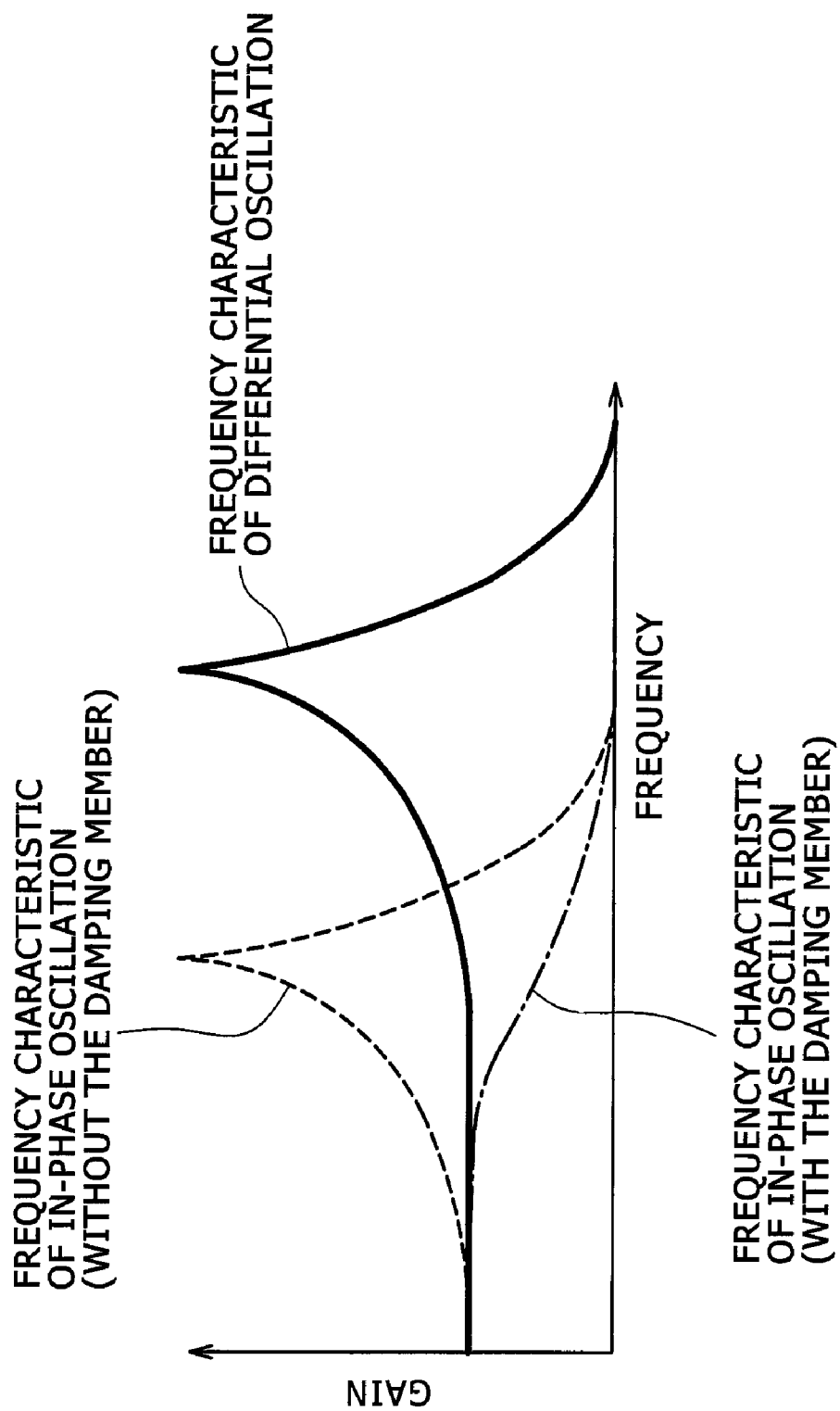
FIG. 4 is a graph showing the frequency characteristic of the measuring element of the angular velocity measuring device in the first embodiment.
Figure 5:
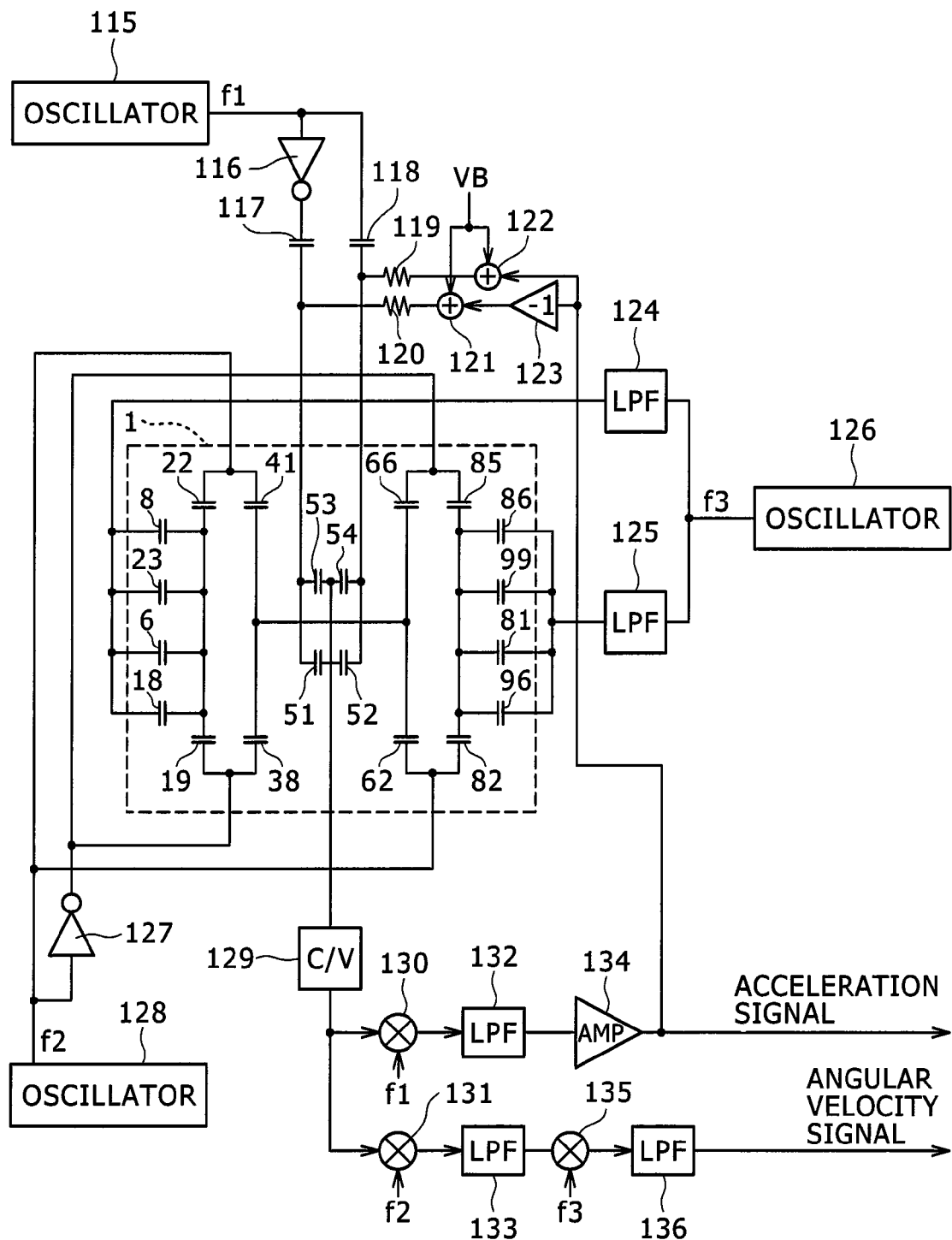
FIG. 5 is a circuit diagram of a drive circuit included in the angular velocity measuring device in the first embodiment.

An angular velocity measuring device in a first embodiment according to the present invention will be described with reference to FIGS. 1 to 5. FIG. 1 is a plan view of a measuring element included in an angular velocity measuring device in a first embodiment according to the present invention, FIG. 2 is a sectional view taken on the line A-A' in FIG. 1, FIG. 3 is a mechanical model of the measuring element included in the angular velocity measuring device in the first embodiment, FIG. 4 is a graph showing the frequency characteristic of the measuring element of the angular velocity measuring device in the first embodiment, and FIG. 5 is a circuit diagram of a drive circuit included in the angular velocity measuring device in the first embodiment.

A measuring element 1 included in the angular velocity measuring device in the first embodiment will be described with reference to FIGS. 1 and 2.

The measuring element 1 is formed by forming a longitudinal groove in a silicon layer 105 included in a SOI substrate having the silicon layer 105, an insulating film 106 and a silicon substrate 107, removing a part of the insulating film 106, forming a movable part and a stationary part in the silicon layer 105, and attaching a glass substrate 104 provided with recesses to the silicon layer 105 by anodic bonding or the like. The measuring element 1 includes first and second electrostatic force generating units, first and second oscillators, a viscous force generating mechanism, and a frame 2 joined to the glass substrate 104. The components of the angular velocity measuring device will be described. An axis extending in the oscillating direction of the oscillators will be called an X-axis, an axis perpendicular to the X-axis and parallel to the surface of the silicon substrate 107 will be called a Y-axis, and an axis perpendicular to the surface of the silicone substrate 107 will be called a Z-axis.

The first electrostatic force generating unit includes a frame 20 spaced apart from the silicon substrate 107, frames 12 and 14 fixed to the silicon substrate 107, comb electrodes 6 and 18 formed by meshing comb electrodes formed on the frames 20 and 12, comb electrodes 8 and 23 formed by meshing comb electrodes formed on the frame 20 and the frame 14, a connecting pad 11 formed on the frame 12, a connecting pad 13 formed on the frame 14, anchors 3 and 4 fixed to the silicon substrate 107, a support beam 5 elastically supporting the frame 20 on the anchors 3 and 4, anchors 9 and 10 fixed to the silicon substrate 107, a support beam 7 elastically supporting the frame 20 on the anchors 9 and 10, and a connecting beam 21 connecting an outer frame 28 included in the first oscillator to the frame 20. Folded beams are used as the support beams 5 and 7 to provide a long stroke. The connecting beam 21 is a straight beam rigid with respect to directions parallel to the X-axis and flexible with respect to directions parallel to the Y-axis. Thus, the first oscillator is prevented from being obliquely pulled by the unbalanced electrostatic forces generated by the comb electrodes 6, 8, 18 and 23.

The second electrostatic force generating unit includes a frame 83 spaced apart from the silicon substrate 107, frames 93 and 103 fixed to the silicon substrate 107, comb electrodes 81 and 96 formed by meshing comb electrodes formed on the frames 83 and 93, comb electrodes 86 and 99 formed by meshing comb electrodes formed on the frames 83 and 103, a connecting pad 92 formed on the frame 93, a connecting pad 102 formed on the frame 103, anchors 94 and 95 fixed to the silicon substrate 107, a support beam 97 elastically supporting the frame 83 on the anchors 94 and 95, anchors 100 and 101 fixed to the silicon substrate 107, a support beam 98 elastically supporting the frame 83 on the anchors 100 and 101, and a connecting beam 84 connecting an outer frame 71 included in the second oscillator to the frame 83. Folded beams are used as the support beams 97 and 98 to provide a long stroke. The connecting beam 84 is a straight beam rigid with respect to direction parallel to the X-axis and flexible with respect to directions parallel to the Y-axis. Thus, the second oscillator is prevented from being obliquely pulled by the unbalanced electrostatic forces generated by the comb electrodes 81, 86, 96 and 99.

The first oscillator includes the outer frame 28 spaced apart from the silicon substrate 107, elastic beams 15, 26, 33 and 45 supporting the outer frame 28, anchors 16 and 17 holding the elastic support beam 15 on the silicon substrate 107, anchors 25 and 27 holding the elastic support beam 26 on the silicon substrate 107, anchors 34 and 35 holding the elastic support beam 33 on the silicon substrate 107, anchors 44 and 46 holding the elastic support beam 45 on the silicon substrate 107, an inner frame 24 disposed inside the outer frame 28 and spaced apart from the silicon substrate 107, connecting beams 29, 30, 31 and 32 supporting the inner frame 24 so as to be movable relative to the outer frame 28 in directions parallel to the Y-axis, frames 37 and 42 fixed to the silicon substrate 107, parallel flat electrodes 19 and 38 formed by meshing flat electrodes formed on the frame 37 and the inner frame 24, parallel flat electrodes 22 and 41 formed by meshing flat electrodes formed on the frame 42 and the inner frame 24, a connecting pad 36 formed on the frame 37, and a connecting pad 43 formed on the frame 42. Folded beams are used as the elastic support beams 15, 26, 33 and 45 to provide a long stroke in directions parallel to the X-axis. The two elastic support beams 15 and 33 and the two elastic support beams 26 and 45 are disposed on the opposite sides, respectively, to ensure stiffness with respect to directions parallel to the Y-axis. As shown in FIG. 2, wiring lines can be extended outside the glass substrate 104 through openings formed in the glass substrate 104. Since a wiring line connected to the connecting pad 43 can be thus extended outside the glass substrate 104, any cuts for wiring lines do not need to be formed in the outer frame 28 and the inner frame 24. Therefore, the outer frame 28 and the inner frame 24 are rigid and oscillations in an unnecessary oscillation mode can be reduced. This advantage is effective also with the other connecting pads.

The second oscillator includes an outer frame 71 spaced apart from the silicon substrate 107, elastic support beams 59, 69, 76 and 90 supporting the outer frame 71, anchors 60 and 61 holding the elastic support beam 59 on the silicon substrate 107, anchors 68 and 70 holding the elastic support beam 69 on the silicone substrate 107, anchors 77 and 78 holding the elastic support beam 76 on the silicon substrate 107, anchors 89 and 91 holding the elastic support beam 90 on the silicon substrate 107, an inner frame 67 disposed inside the outer frame 71 and spaced apart from the silicon substrate 107, connecting beams 72, 73, 74 and 75 supporting the inner frame 67 so as to be movable relative to the outer frame 71 in directions parallel to the Y-axis, frames 80 and 87 fixed to the silicon substrate 107, parallel flat electrodes 62 and 82 formed by meshing flat electrodes formed on the frame 80 and the inner frame 67, parallel flat electrodes 66 and 85 formed by meshing flat electrodes formed on the frame 87 and the inner frame 67, a connecting pad 79 formed on the frame 80, and a connecting pad 88 formed on the frame 87.

The viscous force generating mechanism includes a frame 64 spaced apart from the silicon substrate 107, elastic connecting beams 39 and 40 elastically connecting the frame 64 and the outer frame 28 of the first oscillator, elastic connecting beams 63 and 65 elastically connecting the frame 64 and the outer frame 71 of the second oscillator, frames 47, 49, 55 and 57 fixed to the silicon substrate 107, a parallel flat electrode 51 formed by meshing flat electrodes formed on the frames 64 and 47, a parallel flat electrode 52 formed by meshing flat electrodes formed on the frames 64 and 49, a parallel flat electrode 53 formed by meshing flat electrodes formed on the frames 64 and 55, a parallel flat electrode 54 formed by meshing flat electrodes formed on the frames 64 and 57, a connecting pad 48 formed on the frame 47, a connecting pad 50 formed on the frame 49, a connecting pad 56 formed on the frame 55, and a connecting pad 58 formed on the frame 57. A spring system constituted of the elastic connecting beams 39, 40, 63 and 65, and the frame 64 serves as an elastic connecting beam elastically connecting the first and the second oscillator. The parallel flat electrodes 51, 52, 53 and 54 produce high viscous force against motions in directions parallel to the X-axis by a squib film effect produced by the movement of air between the adjacent ones of the electrodes. As shown in FIG. 2, gaps between the parallel flat electrodes 51, 52, 53 and 54 and the glass substrate 104 are narrowed to increase the viscous force produced by the parallel flat electrodes 51, 52, 53 and 54 by limiting air flow. A displacement of the frame 64 (the center of an elastic connecting beam elastically connecting the first and the second oscillator) in a direction parallel to the X-axis and a displacement of the frame 64 in a direction parallel to the Y-axis can be determined through the measurement of capacitances of the parallel flat electrodes 51, 52, 53 and 54. The displacement in a direction parallel to the X-axis and the displacement in a direction parallel to the Y-axis can be controlled by electrostatic force. Thus, the influence of oscillations on the angular velocity measuring device is reduced by suppressing the in-phase oscillation of the first and the second oscillator and the influence of dc acceleration on the angular velocity measuring device is reduced by controlling the displacements of the frame 64 in directions respectively parallel to the X-axis and the Y-axis.

The effect of the viscous force generating mechanism will be described with reference to FIGS. 3 and 4. Referring to FIG. 3, a mechanical model of the measuring element 1 includes a first oscillator 109, a second oscillator 113, a viscous force generating mechanism 112, a spring 108 extended between the first oscillator 109 and a substrate, a spring 110 extended between the first oscillator 109 and the viscous force generating mechanism 112, a spring 111 extended between the second oscillator 113 and the viscous force generating mechanism, and a spring 114 extended between the second oscillator 113 and the substrate. The first oscillator s109 has a mass M1, the second oscillator 113 has a mass M2, the viscous force generating element 112 has a viscosity constant Kd, the springs 108, 110, 111 and 114 have spring constants K1, K2, K3 and K4, respectively. As shown in FIG. 4, the mechanical model oscillates in two oscillating modes, namely, a differential oscillation mode and an in-phase oscillation mode. The resonance frequency of the in-phase oscillation is lower than that of the differential oscillation. The oscillation needed by the angular velocity measuring device is a differential oscillation and in-phase oscillation is unnecessary. In-phase oscillation causes an error in angular velocity measurement. When an oscillation damping member, such as a rubber member, is combined with the measuring element 1 to attenuate the oscillation of the measuring element 1, the oscillation damping member has a high effect on damping oscillations of high frequencies and a low effect on damping oscillations of low frequencies. Thus, it is desirable to raise the resonance frequency of in-phase oscillation. To diminish the influence of stress induced in the silicon substrate 107 by the warping or thermal expansion of the silicon substrate 107, the spring constant K1 of the spring 108 extended between the first oscillator 109 and the substrate and the spring constant K4 of the spring 114 extended between the second oscillator 113 and the substrate need to be diminished. However, if the spring constants K1 and K4 are diminished, the resonance frequency of the in-phase oscillation decreases and the effect of the oscillation damping member is lessened. A viscous force (damping force) is exerted on the node of the differential oscillation of the first oscillator 109 and the second oscillator 113 by the viscous force generating mechanism 112 so that resonance may not occur in the in-phase mode even if the resonance frequency of the in-phase mode is lowered as shown in FIG. 4. Since the enhancement of the in-phase oscillation by an external oscillation applied to the measuring element 1 can be thus suppressed and the spring constants K1 and K4 can be reduced, the influence of stress induced in the silicon substrate 107 can be diminished. An acceleration sensor provided with the viscous force generating mechanism 112 constituted of the parallel flat electrodes 51, 52, 53 and 54 as shown in FIG. 1 does not have any resonance characteristic and can determine a displacement in a direction parallel to the X-axis on the basis of changes in the capacitances of the parallel flat electrodes 51, 52, 53 and 54. If the acceleration sensor has a resonance characteristic, a large error is caused. Since displacements in directions respectively parallel to the X-axis and the Y-axis can be determined on the basis of changes in the capacitances of the parallel flat electrodes 51, 52, 53 and 54 and electrostatic forces can be applied to the parallel flat electrodes 51, 52, 53 and 54, an electrostatic servomechanism can always maintain the displacements respectively in directions respectively parallel to the X-axis and the Y-axis at zero. Thus, the influence of the displacements of the first and the second oscillator in a direction parallel to the X-axis or the Y-axis resulting from a dc acceleration acting on the measuring element 1 of the angular velocity measuring device on the angular velocity measuring characteristic is diminished.

A second feature of the measuring element 1 of the angular velocity measuring device will be described. In this measuring element 1 of the angular velocity measuring device, the first electrostatic force generating unit and the first oscillator are mechanically connected by the straight connecting beam 21 rigid with respect to directions parallel to the X-axis and flexible with respect to directions parallel to the Y-axis. Thus, the second oscillator can be pulled straight even if the electrostatic forces generated by the comb electrodes 6, 8, 18 and 23 are not balanced. The second electrostatic force generating unit and the second oscillator are mechanically connected by the straight connecting beam 84 rigid with respect to directions parallel to the X-axis and flexible with respect to directions parallel to the Y-axis. Thus, the second oscillator can be pulled straight even if the electrostatic forces generated by the comb electrodes 81, 86, 96 and 99 are not balanced. The connecting beams 21 and 84 and the respective centers of gravity of the first and the second oscillator are aligned to make the first and the second oscillator oscillate only in directions parallel to the X-axis. Thus, the first and the second oscillator are restrained from oscillating in directions parallel to the Y-axis so that the respective inner frames 24 and 67 of the first and the second oscillator are prevented from oscillating in directions parallel to the Y-axis to achieve the measurement of angular velocity in a high accuracy.

The configuration of the drive circuit of the angular velocity measuring device will be described with reference to FIG. 5. In FIG. 5, the comb electrodes 6, 8, 18, 23, 81, 86, 96 and 99, and the parallel flat electrodes 19, 22, 38, 41, 51, 52, 53, 54, 62, 66, 82 and 85 of the measuring element 1 are represented by the electronic symbol of capacitor for convenience. The drive circuit of the angular velocity measuring device in the first embodiment includes an oscillator 115 that generates a signal of a frequency f1, an inverter 116 for inverting the output signal of the oscillator 115, a capacitor 117 that removes the dc component the output signal of the inverter 116 to apply a voltage to the parallel flat electrodes 51 and 53, a capacitor 118 that removes the dc component of the output signal of the oscillator 115 to apply a voltage to the parallel flat electrodes 52 and 54, an oscillator 128 that generates a signal of a frequency f2 and applies a voltage to the parallel flat electrodes 22, 41, 62 and 82, an inverter 127 that inverts the output signal of the oscillator 128 and applies a voltage to the parallel flat electrodes 19, 38, 66 and 85, an oscillator 126 that generates a signal of a frequency f3, a LPF (low-pass filter) 124 that attenuates the high-frequency component of the output signal of the oscillator 126 and applies a voltage to the comb electrodes 6, 8, 18 and 23, a LPF 125 that attenuates the high-frequency component of the output signal of the oscillator 126 and applies a voltage to the comb electrodes 81, 86, 96 and 99, a CV converter 129 that maintains the common terminal of a capacitor constituted of the comb electrodes 6, 8, 18, 23, 81, 86, 96 and 99 and the parallel flat electrodes 19, 22, 38, 41, 62, 66, 82 and 85 at a fixed potential and converts charge generated by a voltage wave applied to the comb electrodes 6, 8, 18, 23, 81, 86, 96 and 99 and the parallel flat electrodes 19, 22, 38, 41, 62, 66, 82 and 85 into a voltage, a multiplier 130 that multiplies the output signal of the CV converter 129 by the signal of the frequency f1, a multiplier 131 that multiplies the output signal of the CV converter 129 by the signal of the frequency f2, a LPF 133 that attenuates the high-frequency component of the high-frequency component of the output signal of the multiplier 131, a multiplier 135 that multiplies the output signal of the LPF 133 by the signal of the frequency f3, a LPF 136 that attenuates the high-frequency component of the output signal of the multiplier 135 and provides a signal indicating an angular velocity, a LPF 132 that attenuates the high-frequency component of the output signal of the multiplier 130, an amplifier 134 that amplifies the output signal of the LPF 132 and provides a signal indicating an acceleration, an inverter 123 that inverts the sign of the output signal of the amplifier 134, an adder 122 that adds a bias voltage VB to the output signal of the amplifier 134, an adder 121 that adds the bias voltage VB to the output signal of the inverter 123, a resistor 119 through which the output signal of the adder 122 is applied to the parallel flat electrodes 52 and 54, and a resistor 120 through which the output signal of the adder 121 is applied to the parallel flat electrodes 51 and 52.

The operation of the drive circuit will be described.

A driving operation for driving the first and the second oscillator will be described. The first and the second oscillator are driven by maintaining the common electrode of the comb electrodes 6, 8, 18, 23, 81, 86, 96 and 99 at a fixed potential by the CV converter 129, attenuating the high-frequency component of the output signal of the oscillator 126 by the LPFs 124 and 125, and applying a voltage to the comb electrodes 6, 8, 18, 23, 81, 86, 96 and 99 to make the first and the second electrostatic force generating unit generate electrostatic forces, and pulling the first and the second oscillator in opposite directions at the frequency f3. The frequency f3 is adjusted to the resonance frequency of the differential oscillation of the first and the second oscillator so that the first and the second oscillator make a big differential oscillation. The LPFs 124 and 125 attenuate the high-frequency component of the output signal of the oscillator 126 to prevent the saturation of the CV converter 129. The CV converter 129 is readily saturated because signals of the same phase are applied to the comb electrodes 6, 8, 18 and 23 and the comb electrodes 81, 86, 96 and 99, the comb electrodes 6; 8, 18, 23, 81, 86, 96 and 99 have large capacitances to generate a high electrostatic forces, and a high voltage is applied to the comb electrodes 6, 8, 18, 23, 81, 86, 96 and 99 to generate a high electrostatic force and since a large charge flows into the CV converter 129. Therefore, to prevent the quick saturation of the CV converter 129, the LPFs 124 and 125 attenuates the high-frequency component of the voltage to be applied to the comb electrodes 6, 8, 18, 23, 81, 86, 96 and 99 to apply only the low-frequency component of the voltage to the comb electrodes 6, 8, 18, 23, 81, 86, 96 and 99 and the gain of the low-frequency signal of the CV converter 129 is reduced. The LPFs 124 and 125 have a filtering characteristic to transmit signals of the frequency f3 and to intercept signals of the frequencies f1 and f2. The CV converter 129 has a sufficiently low gain with the signal of the frequency f3 and has a sufficiently high gain with the signals of the frequencies f1 and f2.

An angular velocity measuring operation will be described. The measurement of angular velocity can be achieved by detecting a differential signal indicating the difference between the capacitance of the parallel flat electrodes 19, 38, 66 and 85 and the capacitance of the parallel flat electrodes 22, 41, 62 and 82, and detecting a component of the frequency f3 of the differential signal, namely, the frequency of the oscillation of the first and the second oscillator. This drive circuit supplies a charge corresponding to the difference between the respective capacitances of the parallel flat electrodes 19, 38, 66 and 85 and the parallel flat electrodes 22, 41, 62 and 82 to the CV converter 129 to determine the differential signal indicating the difference between the respective capacitances of the parallel flat electrodes 19, 38, 66 and 85 and the parallel flat electrodes 22, 41, 62 and 82 by supplying inverted signals of the frequency f2 to the parallel flat electrodes 19, 38, 66 and 85 and the parallel flat electrodes 22; 41, 62 and 82. The frequency f2 sufficiently higher than the frequency f3 is used to use a frequency range in which the CV converter 129 has a high gain. Thus, a wave signal having a frequency component of the frequency f2 and dependent on the difference between the respective capacitances of the parallel flat electrodes 19, 38, 66 and 85 and the parallel flat electrodes 22, 41, 62 and 82 appears at the output of the CV converter 129. The multiplier 131 multiplies the voltage wave by the signal of the frequency f2, the LPF 133 attenuates the high-frequency component of the output signal of the multiplier 131 to extract the signal component of the frequency f2 from the output voltage of the CV converter 129 to detect a differential signal indicating the difference between the respective capacitances of the parallel flat electrodes 19, 38, 66 and 85 and the parallel flat electrodes 22, 41, 62 and 82. A signal indicating an angular velocity is obtained by extracting the signal component of the frequency f3 of the differential signal by multiplying the differential signal by a signal of the frequency f3 by the multiplier 135 and attenuating the high-frequency component of the output signal of the multiplier 135 by the LPF 136.

An acceleration measuring operation and the servo operation of the frame 64 will be described. Acceleration can be determined only by detecting a capacitance difference signal indicating the difference between the capacitance of the parallel flat electrodes 51 and 53 and that of the parallel flat electrodes 52 and 54. This drive circuit carries out an acceleration measuring method that exerts an electrostatic force on the parallel flat electrodes 51 and 53 and the parallel flat electrodes 52 and 54 such that the capacitance difference signal is reduced to zero and determines on the basis of this electrostatic force. The drive circuit gives inverse signals of the frequency f1 respectively to the parallel flat electrodes 51 and 53 and the parallel flat electrodes 52 and 54 to reduce the obtain the capacitance difference signal indicating the difference between the capacitance of the parallel flat electrodes 51 and 53 and that of the parallel flat electrodes 52 and 54 and supplies an electric charge dependent on the capacitance difference to the CV converter 129. The frequency f1 sufficiently higher than the frequency f3 is used to use the frequency range in which the gain of the CV convert 129 is high. Thus, the output signal of the CV converter 129 includes a component of the frequency f1 and a voltage wave dependent on the difference between the capacitance of the parallel flat electrodes 51 and 53 and that of the parallel flat electrodes 52 and 54 is provided. The multiplier 130 multiplies the voltage wave by the signal of the frequency f1 and the LPF 132 extracts a signal of the frequency f1 from an output voltage provided by the CV converter 129 by attenuating the high-frequency component of the output voltage provided by the CV converter to obtain a capacitance difference signal indicating the difference between the respective capacitances of the parallel flat electrodes 51 and 53 and the parallel flat electrodes 52 and 54. The amplifier 134 amplifies the capacitance difference signal, the adder 122 gives a signal obtained by adding the bias voltage VB to the output of the amplifier 134 to the parallel flat electrodes 52 and 54, the adder 121 gives a signal obtained by adding the bias voltage VB to a signal obtained by inversing the polarity of the output of the amplifier 134 to the parallel flat electrodes 51 and 53. Thus, the parallel flat electrodes 52 and 54 and the parallel flat electrodes 51 and 53 exert electrostatic forces on the frame 64 and the capacitance difference between the parallel flat electrodes 52 and 54 and the parallel flat electrodes 51 and 53 is reduced to zero to hold the frame 64 at a fixed position. Consequently, an inertial force produced by acceleration acting on the measuring element 1 in a direction parallel to the X-axis balances the electrostatic force exerted by the parallel flat electrodes 52 and 54 and the parallel flat electrodes 51 and 53 on the frame 64. Since the electrostatic forces exerted on the frame 64 by the parallel flat electrodes 51 and 53 and the parallel flat electrodes 52 and 54 varies according to the output voltage of the amplifier 134, a signal carrying the acceleration can be obtained from the output signal of the amplifier 134. As mentioned in the description of the drive circuit, since the frame 64 is held at the fixed position by the servo effect of the electrostatic force to prevent the frame 64 from being displaced by the acceleration, the respective oscillations of the first and the second oscillator can be stabilized. Thus the influence of the acceleration on the measurement of angular velocity can be reduced.

Figure 6:
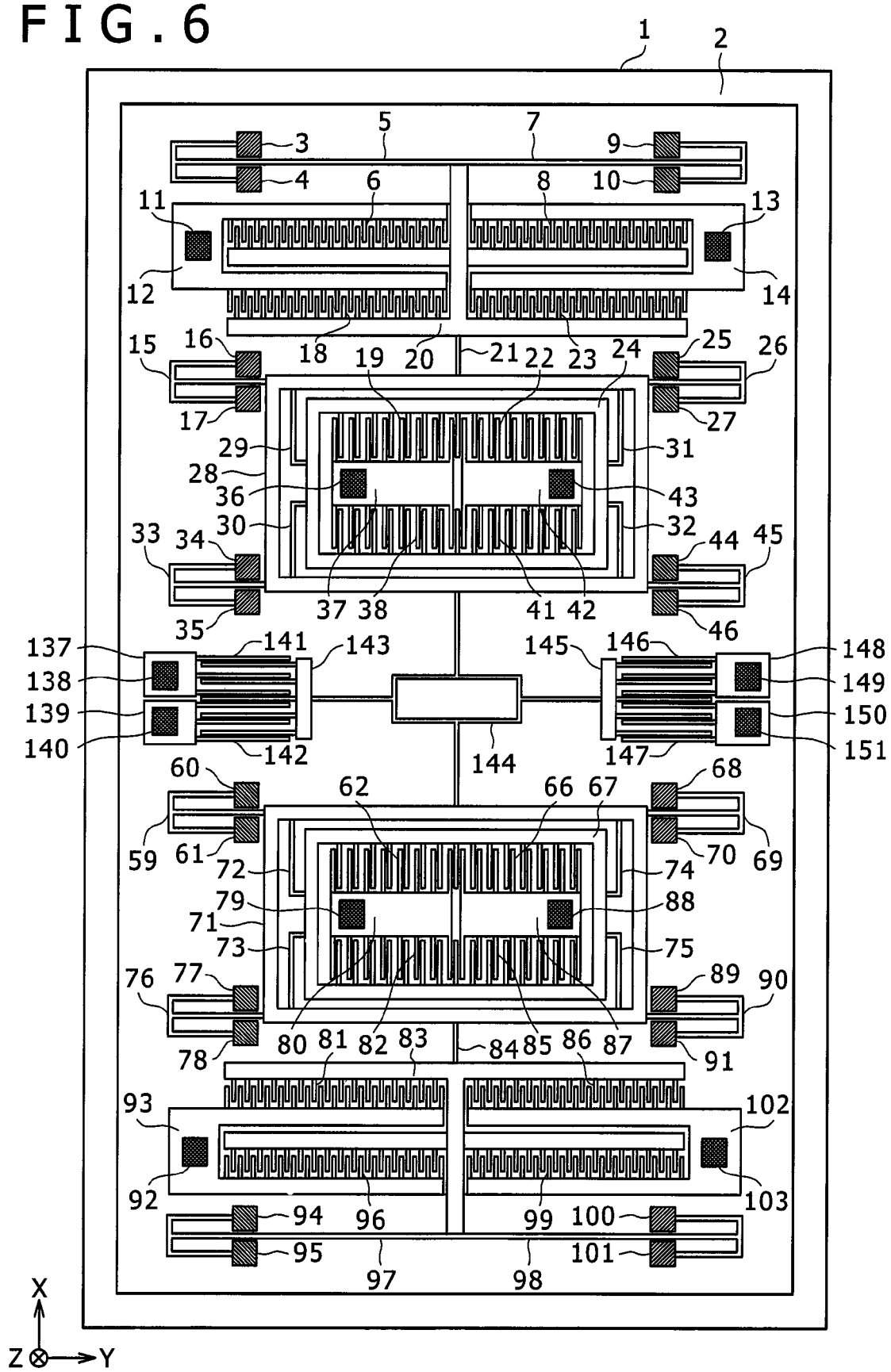
FIG. 6 is a plan view of a measuring element included in an angular velocity measuring device in a second embodiment according to the present invention.

An angular velocity measuring device in a second embodiment according to the present invention will be described with reference to FIG. 6 showing the angular velocity measuring device in the second embodiment in a plan view. The angular velocity measuring device in the second embodiment is provided with a measuring element 1 including a viscous force generating mechanism in a modification of the viscous force generating mechanism 112 included in the measuring element 1 of the angular velocity measuring device in the first embodiment. Referring to FIG. 6, the viscous force generating mechanism included in the measuring element 1 of the angular velocity measuring device in the second embodiment includes an elastic connecting beam 144 elastically connecting the outer frame 28 of the first oscillator and the outer frame 71 of the second oscillator, frames 143 and 145 spaced apart from the silicon substrate 107, frames 137, 139, 148 and 150 fixed to the silicon substrate 107, a parallel flat electrode 141 formed by meshing flat electrodes respectively held on the frames 137 and 143, a parallel flat electrode 142 formed by meshing flat electrodes respectively held on the frames 139 and 143, a parallel flat electrode 146 formed by meshing flat electrodes respectively held on the frames 145 and 148, a parallel flat electrode 147 formed by meshing flat electrodes held respectively on the frames 145 and 150, a connecting pad 138 formed on the frame 137, a connecting pad 140 formed on the frame 139, a connecting pad 149 formed on the frame 148, a connecting pad 151 formed on the frame 150. The parallel flat electrodes 141, 142, 146 and 147 produce high viscous force against motions in directions parallel to the X-axis by a squib film effect produced by the movement of air between the adjacent ones of the electrodes. Gaps between the parallel flat electrodes 141, 142, 146 and 147, and the glass substrate 104, similarly to those of the first embodiment, are narrowed to increase the viscous force produced by the parallel flat electrodes 141, 142, 146 and 147 by limiting air flow. A displacement of a middle point on a line extending between the first and the second oscillator in a direction parallel to the X-axis and a displacement of the same in a direction parallel to the Y-axis can be determined through the measurement of the respective capacitances of the parallel flat electrodes 141, 142, 146 and 147. The displacement in a direction parallel to the X-axis and the displacement in a direction parallel to the Y-axis can be controlled by electrostatic force. Thus, the influence of oscillations on the angular velocity measuring device is reduced by suppressing the high-frequency in-phase oscillation of the first and the second oscillator by a high viscous force and the influence of dc acceleration on the angular velocity measuring device is reduced by controlling the displacements in directions respectively parallel to the X-axis and the Y-axis. The joint of the connecting beam 21 and the first electrostatic force generating unit, the joint of the connecting beam 21 and the first oscillator, the joint of the elastic connecting beam 144 and the first oscillator, the joint of the elastic connecting beam 144 and the second oscillator, the joint of the connecting beam 84 and the second electromotive force generating unit, the joint of the connecting beam 84 and the second oscillator, the center of gravity of the first oscillator and the center of gravity of the second oscillator are aligned to make the first and the second oscillator oscillate only in directions parallel to the X-axis. Thus the first and the second oscillator are restrained from oscillation in directions parallel to the Y-axis to prevent the respective inner frames 24 and 67 of the first and the second oscillator from being oscillated in directions parallel to the Y-axis so that angular velocity may be measured in a high accuracy.

Figure 7:
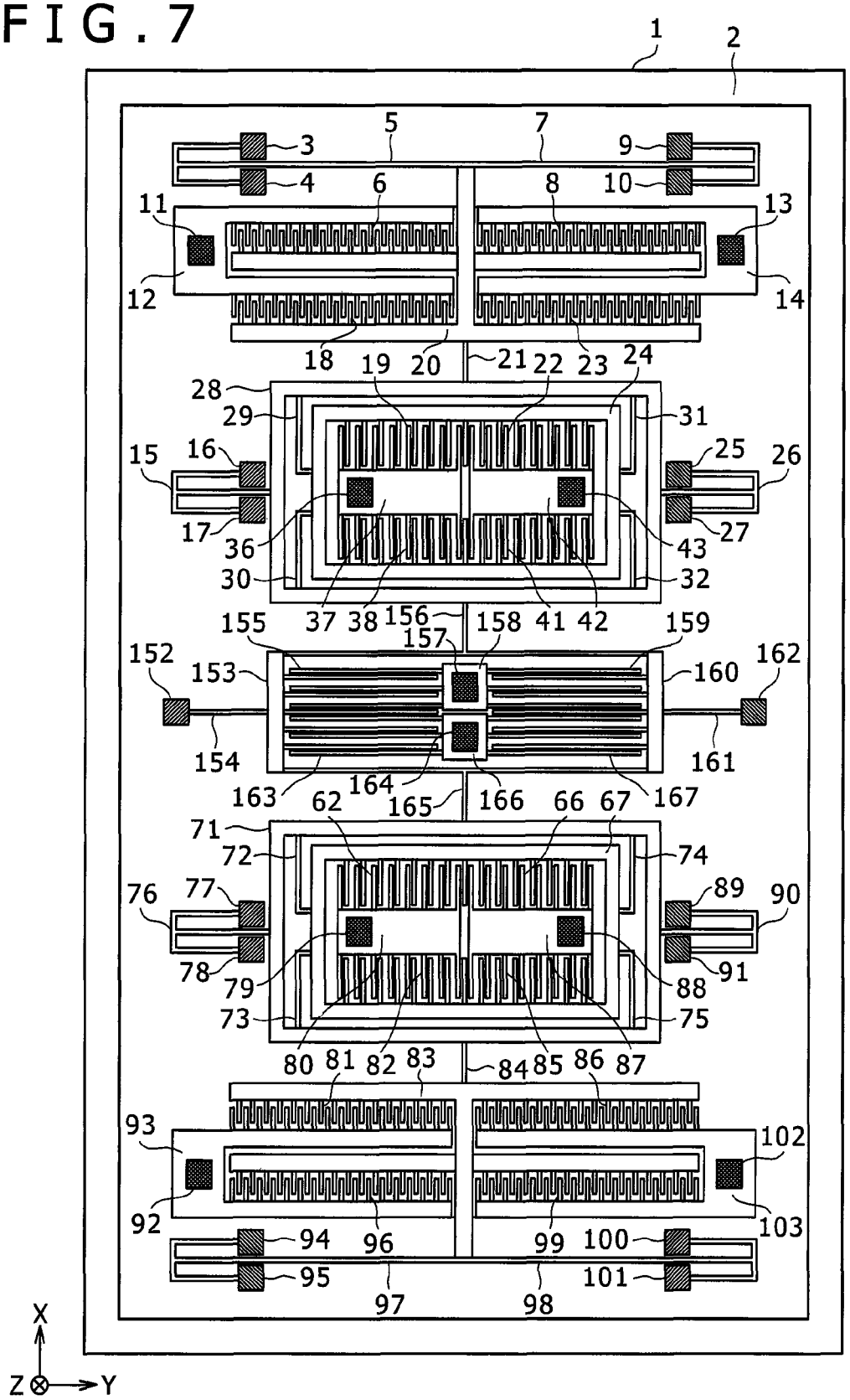
FIG. 7 is a plan view of a measuring element included in an angular velocity measuring device in a third embodiment according to the present invention.

An angular velocity measuring device in a third embodiment according to the present invention will be described with reference to FIG. 7 showing the angular velocity measuring device in the third embodiment in a plan view. The angular velocity measuring device in the second embodiment is provided with a measuring element 1 including a viscous force generating mechanism in a modification of the viscous force generating mechanism 112 included in the measuring element 1 of the angular velocity measuring device in the first embodiment. Referring to FIG. 7, the viscous force generating mechanism included in the measuring element 1 of the angular velocity measuring device in the third embodiment includes frames 153 and 160 spaced apart from the silicon substrate 107, a T-shaped elastic connecting beam 156 elastically connecting the outer frame 28 of the first oscillator to the frames 153 and 160, a T-shaped elastic connecting beam 165 elastically connecting the outer frame 71 of the second oscillator to the frames 153 and 160, frames 157 and 166 fixed to the silicon substrate 107, anchors 152 and 162 fixed to the silicon substrate 107, a support beam 154 elastically supporting the 153 on the anchor 152, a support beam 161 elastically supporting the frame 160 on the anchor 162, a parallel flat electrode 155 formed by meshing flat plates held on the frames 153 and 158, a parallel flat electrode 163 formed by meshing flat electrodes held on the frames 153 and 166, a parallel flat electrode 159 formed by meshing flat electrodes held on the frames 160 and 158, a parallel flat electrode 167 formed by meshing flat electrodes held on the frames 160 and 166, a connecting pad 157 formed on the frame 158, and a connecting pad 164 formed on the frame 166. A spring system constituted of the elastic connecting beams 156 and 165 and the frames 153 and 160 serves as an elastic connecting beam elastically connecting the first and the second oscillator. The parallel flat electrodes 155, 159, 163 and 167 produce high viscous force against motions in directions parallel to the X-axis by a squib film effect produced by the movement of air between the adjacent ones of the electrodes. Gaps between the parallel flat electrodes 155, 159, 163 and 167, and the glass substrate 104, similarly to those of the first embodiment, are narrowed to increase the viscous force produced by the parallel flat electrodes 155, 159, 163 and 167 by limiting air flow. A displacement of a middle point on a line extending between the first and the second oscillator in a direction parallel to the X-axis can be determined through the measurement of the respective capacitances of the parallel flat electrodes 155, 159, 163 and 167. The displacement in a direction parallel to the X-axis can be controlled by electrostatic force. Thus, the influence of oscillations on the angular velocity measuring device is reduced by suppressing the high-frequency in-phase oscillation of the first and the second oscillator by a high viscous force and the influence of do acceleration on the angular velocity measuring device is reduced by controlling the displacement in directions parallel to the X-axis. The joint of the connecting beam 21 and the first electrostatic force generating unit, the joint of the connecting beam 21 and the first oscillator, the joint of the elastic connecting beam 156 and the first oscillator, the joint of the elastic connecting beam 165 and the second oscillator, the joint of the connecting beam 84 and the second electromotive force generating unit, the joint of the connecting beam 84 and the second oscillator, the center of gravity of the first oscillator and the center of gravity of the second oscillator are aligned to make the first and the second oscillator oscillate only in directions parallel to the X-axis. Thus the first and the second oscillator are restrained from oscillation in directions parallel to the Y-axis to prevent the respective inner frames 24 and 67 of the first and the second oscillator from being oscillated in directions parallel to the Y-axis so that angular velocity may be measured in a high accuracy.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An angular velocity measuring device comprising:
    first and second oscillators elastically supported on a substrate;
    an elastic connecting beam elastically connecting the first and the second oscillators;
    an oscillating means for oscillating the first and second oscillators for differential oscillation by pulling the first and second oscillators in opposite driving directions;
    wherein a viscous force generating means for producing viscous force against motions in said opposite driving directions to suppress in-phase oscillation of the first and second oscillators in said driving directions is incorporated into the elastic connecting beam.

2. The angular velocity measuring device according to claim 1, wherein the viscous force generating means includes first flat plates mechanically connected to the elastic connecting beam, and second flat plates mechanically connected to the substrate opposite to the first flat plates, respectively.

3. The angular velocity measuring device according to claim 2 further comprising a capacitance measuring means for measuring capacitance between the first flat plates mechanically connected to the elastic connecting beam and the second flat plates mechanically connected to the substrate.

4. The angular velocity measuring device according to claim 3 further comprising an electrostatic force generating means for exerting electrostatic force on the first and the second oscillator such that the capacitance measuring means provides a predetermined output.

5. The angular velocity measuring device according to claim 4 further comprising a cover disposed opposite to the substrate so as to cover the first and the second oscillators;
wherein a gap between the cover and the viscous force generating means is narrower than a gap between the cover, and the first and the second oscillator.

6. The angular velocity measuring device according to claim 4 further comprising an acceleration measuring means that provides a signal based on the capacitance between the first flat plates mechanically connected to the elastic connecting beam and the second flat plates mechanically connected to the substrate and indicating an acceleration in directions in which the first and the second oscillator oscillate.

7. The angular velocity measuring device according to claim 3 further comprising an acceleration measuring means that provides a signal based on the capacitance between the first flat plates mechanically connected to the elastic connecting beam and the second flat plates mechanically connected to the substrate and indicating an acceleration in directions in which the first and the second oscillator oscillate.

8. The angular velocity measuring device according to claim 3 further comprising a cover disposed opposite to the substrate so as to cover the first and the second oscillators;
wherein a gap between the cover and the viscous force generating means is narrower than a gap between the cover, and the first and the second oscillator.

9. The angular velocity measuring device according to claim 2 further comprising a cover disposed opposite to the substrate so as to cover the first and the second oscillators;
wherein a gap between the cover and the viscous force generating means is narrower than a gap between the cover, and the first and the second oscillator.

10. An angular velocity measuring device comprising:
first and second oscillators elastically supported on a substrate;
an elastic connecting beam elastically connecting the first and the second oscillator; and
an oscillating means for oscillating the first and the second oscillator for differential oscillation; and
a cover disposed opposite to the substrate so as to cover the first and the second oscillators;
wherein a viscous force generating means for suppressing in-phase oscillation of the first and the second oscillator is incorporated into the elastic connecting beam; and
wherein a gap between the cover and the viscous force generating means is narrower than a gap between the cover, and the first and the second oscillator.

11. The angular velocity measuring device according to claim 10 further comprising an acceleration measuring means that provides a signal based on the capacitance between the first flat plates mechanically connected to the elastic connecting beam and the second flat plates mechanically connected to the substrate and indicating an acceleration in directions in which the first and the second oscillator oscillate.

* * * * *